(12) United States Patent
He et al.

(10) Patent No.: US 12,393,343 B2
(45) Date of Patent: Aug. 19, 2025

(54) MEMORY OPERATION METHOD FOR UNALIGNED WRITE, MEMORY AND ELECTRONIC DEVICE

(71) Applicant: GIGADEVICE SEMICONDUCTOR INC., Beijing (CN)

(72) Inventors: Ze He, Beijing (CN); Nanfei Wang, Beijing (CN); Yingwu Zhang, Beijing (CN)

(73) Assignee: GIGADEVICE SEMICONDUCTOR INC., Beijing (CN)

( * ) Notice: Subject to any disclaimer, the term of this patent is extended or adjusted under 35 U.S.C. 154(b) by 25 days.

(21) Appl. No.: 18/397,186

(22) Filed: Dec. 27, 2023

(65) Prior Publication Data

US 2024/0289025 A1    Aug. 29, 2024

(30) Foreign Application Priority Data

Feb. 27, 2023 (CN) .......................... 202310171643.1

(51) Int. Cl.
*G06F 3/06* (2006.01)
*G06F 12/1009* (2016.01)

(52) U.S. Cl.
CPC .......... *G06F 3/0613* (2013.01); *G06F 3/0659* (2013.01); *G06F 3/0673* (2013.01); *G06F 12/1009* (2013.01)

(58) Field of Classification Search
CPC .... G06F 3/0613; G06F 3/0659; G06F 3/0673; G06F 12/1009; G06F 12/0607; G06F 12/0862; G06F 2212/6028; G06F 12/0284; G06F 12/04; G06F 2212/1008; G06F 2212/1024; G06F 12/0292; G06F 13/1605; G06F 13/1668; G06F 3/061
See application file for complete search history.

(56) References Cited

U.S. PATENT DOCUMENTS

| | | | |
|---|---|---|---|
| 8,433,880 B2* | 4/2013 | Iyer .................... | G06F 12/0607 711/E12.016 |
| 10,671,291 B2* | 6/2020 | Lesartre .................. | G06F 13/24 |
| 2009/0228648 A1* | 9/2009 | Wack .................. | G06F 11/1092 711/E12.001 |
| 2011/0296081 A1* | 12/2011 | Hsu ........................ | G06F 9/383 711/E12.001 |
| 2015/0019824 A1* | 1/2015 | Lilly .................. | G06F 12/1027 711/137 |

(Continued)

*Primary Examiner* — Sean D Rossiter
(74) *Attorney, Agent, or Firm* — IPro, PLLC

(57) ABSTRACT

Disclosed are a memory operating method, memory and electronic device. The memory follows a read-write parallel protocol and includes a plurality of memory banks, and the method comprises: writing data to a specified location of the first memory bank corresponding to a current logical address, and pre-reading original data in a specified location of the second memory bank corresponding to a next logical address in a current clock cycle; encoding the pre-read original data and data to be written next, when an instruction to encode based on the pre-read original data in a next clock cycle is obtained; and writing the encoded data to the specified location of the second memory bank in the next clock cycle. By pre-reading the original data corresponding to the incremental address in the current clock cycle, the present disclosure can accelerate an encoding operation that may occur next.

20 Claims, 9 Drawing Sheets

(56) References Cited

U.S. PATENT DOCUMENTS

| | | | |
|---|---|---|---|
| 2017/0075571 A1* | 3/2017 | Chen | G11C 7/22 |
| 2020/0201571 A1* | 6/2020 | Jung | G06F 12/0862 |
| 2020/0272576 A1* | 8/2020 | Haimzon | G06F 12/109 |
| 2021/0157733 A1* | 5/2021 | Bavishi | G06F 12/0862 |
| 2024/0273043 A1* | 8/2024 | Liu | G06F 13/28 |

\* cited by examiner

```
                MACRO 0                          MACRO 1
        Logical address                  Logical address
          00000   | 1...1      |           01000   | 2...2      |
         100000   | 64bit data |          101000   | 64bit data |
        1000000   | 64bit data |         1001000   | 64bit data |
        1100000   | 64bit data |         1101000   | 64bit data |
                  |            |                   |            |
            ⋮     |     ⋮      |             ⋮     |     ⋮      |
                  |   a...a    |                   |            |
                  |            |                   |   b...b    |
                  |            |                   |            |

MACRO 2                          MACRO 3
        Logical address                  Logical address
          10000   | 3...3      |           11000   | 4...4      |
         110000   | 64bit data |          111000   | 64bit data |
        1010000   | 64bit data |         1011000   | 64bit data |
        1110000   | 64bit data |         1111000   | 64bit data |
                  |            |                   |            |
            ⋮     |     ⋮      |             ⋮     |     ⋮      |
                  |   c...c    |                   |            |
                  |            |                   |            |
```

MEMORY OPERATION METHOD FOR UNALIGNED WRITE, MEMORY AND ELECTRONIC DEVICE

CROSS-REFERENCE TO RELATED APPLICATIONS

This application claims priority to Chinese patent application No. 2023101716431 filed on Feb. 27, 2023, the disclosure of which is incorporated herein by reference in its entirety and for all purposes.

TECHNICAL FIELD

The present disclosure relates to the field of memory, and in particular to a memory operation method, memory and electronic device.

BACKGROUND

Improving memory read and write efficiency has always been the direction of memory performance optimization. Compared with a serial protocol (for example, I2C) that can only perform read or write operation, a parallel read and write protocol for memory (for example, AXI) can further improve the interaction efficiency between the host and the memory.

However, for encoding operations such as ECC (Error Correcting Code), in case that the memory needs to perform unaligned writes, each unaligned write will take an additional clock cycle due to an additional read operation. In application scenarios where unaligned writes occur frequently, unaligned writes that each require two clock cycles to complete will reduce the overall read and write efficiency of the memory.

For this reason, a method for improving memory read and write efficiency is needed.

SUMMARY

A technical problem to be solved by the present disclosure is to provide a memory operation method, a memory and an electronic device.

According to a first aspect of the present disclosure, a memory operation method is provided, the memory follows a read-write parallel protocol and includes a plurality of memory banks, the plurality of memory banks includes at least a first memory bank and a second memory bank, the method comprising: writing data currently to be written to a specified location of the first memory bank corresponding to a current logical address of a write transaction in a current clock cycle by a write controller; pre-reading original data in a specified location of the second memory bank corresponding to a next logical address of the write transaction in the current clock cycle by the write controller; encoding the pre-read original data and data to be written next of the write transaction by an encoder, when the write controller obtains an instruction to encode based on the pre-read original data in a next clock cycle; and writing the encoded data to the specified location of the second memory bank in the next clock cycle by the write controller.

According to the second aspect of the present disclosure, a memory is provided, the data access of the memory follows a read-write parallel protocol, and the memory comprising: a plurality of memory banks, the plurality of memory banks includes at least a first memory bank and a second memory bank; a write controller, configured to: writing data currently to be written to a specified location of the first memory bank corresponding to a current logical address of a write transaction in a current clock cycle; pre-reading original data in a specified location of the second memory bank corresponding to a next logical address of the write transaction in the current clock cycle; and an encoder, configured to: encoding the pre-read original data and data to be written next of the write transaction, when an instruction to encode based on the pre-read original data is obtained in a next clock cycle; and only encoding the data to be written next, when an instruction not encoding based on pre-read original data is obtained in the next clock cycle, and the write controller writes the encoded data to the specified position of the second memory bank in the next clock cycle.

According to a third aspect of the present disclosure, an electronic device is provided, comprising: a control unit; and a memory, wherein the control unit and the memory interact via a bus following a parallel read and write protocol, and the memory performs operations described in the first aspect of the present disclosure.

BRIEF DESCRIPTION OF FIGURES

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent same parts.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A memory usually includes multiple memory banks. For example, an SRAM with a capacity of 512 k can be divided into 4 "slices" of physical memory banks, that is, four Macros (Macro 0~3), and each Macro has a storage capacity of 128 k. Each memory bank include multiple memory units, and each memory unit include multiple memory cells (for example, a cell storing "0" or "1").

Figure 1:
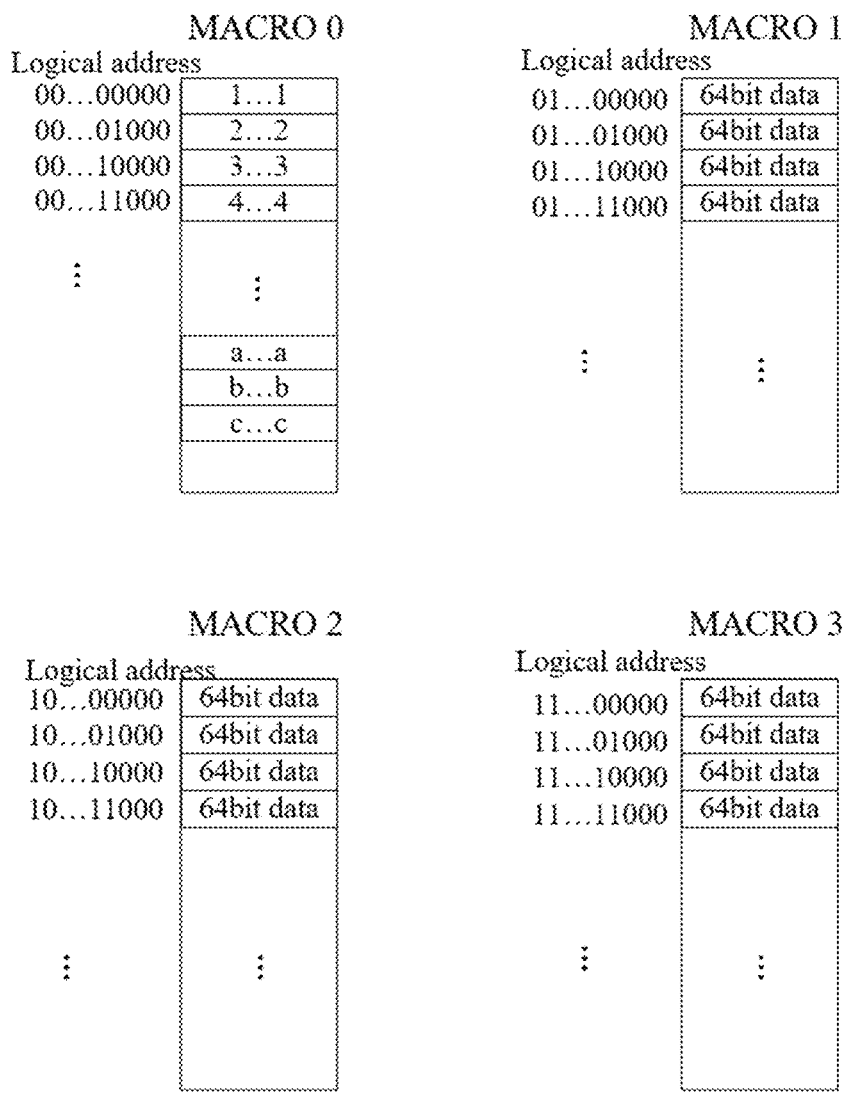
FIG. 1 shows an example of a memory implementation including multiple memory banks based on high-address mapping.

FIG. 1 shows an implementation example in which a memory includes a plurality of memory banks based on high-address mapping. As shown, the memory includes four memory banks Macro 0~3, and each memory bank has the same storage capacity, for example, 128 k (i.e., 128 KB). Each memory bank includes a plurality of memory units, for example, a memory unit with a size of 64 bits (that is, 8 bytes) shown in the figure, and each memory unit includes 64 minimum memory units. The size of the memory unit can usually be set. In one embodiment, the memory communicates with a control unit (that is, a host, not shown in FIG. 1) through a bus conforming to the read-write parallel protocol, and the bit width of the memory unit of the memory bank can be set to correspond to the physical bus width. In other embodiments, each memory bank (Macro) can be composed of n physical memory banks, and the physical bus bit width of the bus is n*64 bits.

It should be understood that in a read-write parallel protocol, the so-called read-write "parallel" is carried out for different memory banks of the same memory, that is, it is allowed to perform a write operation on one memory bank while perform a read operation to another memory bank, but it is not allowed to read and write to one memory bank at the same time (for example, within one clock cycle) (because the same physical memory bank has only one physical access interface).

The example shown in FIG. 1 uses high-address decoding. That is, the four Macros 0~3 correspond to four consecutive logical address ranges, and the upper 16 bits of the address are represented by hexadecimal numbers as 0x2000 (the corresponding continuous logical address range is 0x2000,0000~0x2000,ffff), 0x2001 (the corresponding continuous logical address range is Macro 0x2001, 0000~0x2001,ffff), 0x2002 (the corresponding continuous logical address range is 0x2002,0000~0x2002,ffff) and 0x2003 (the corresponding continuous logical address range is 0x2003,0000~0x2003,ffff).

For this reason, when high-address decoding is performed, consecutive logical addresses (for example, 8 consecutive logical addresses in the following example) correspond to the same Macro. For example, when a continuous read operation for these 8 consecutive logical addresses occurs, the Macro needs to be continuously occupied (for example, 8 consecutive clock cycles occupancy). During the occupancy, in case that a write transaction for the Macro occurs, it is necessary to wait for the current read operation to end, thereby reducing the overall parallelism efficiency of the memory.

As shown in FIG. 1, the size of a memory unit is 64 bits, and the continuous physical addresses in each macro correspond to continuous logical addresses (the minimum addressing unit of a logical address is usually 1 byte of data, and the above memory unit size is 64 bit, that is, 8 bytes, so the actual interval of continuous logical addresses is 8). The only difference is that the high 16-bit address of Macro 0~3 corresponds to 0x2000, 0x2001, 0x2002, and 0x2003 in hexadecimal, that is, the high data bits [17:16] of the logical address are 00, 01, 10, and 11 in binary as shown in FIG. 1, respectively.

When addressing consecutive logical addresses (for example, the lower 8-bit address [7:0] is represented as 00, 08, 10, 18 in hexadecimal) to read data "1 . . . 1; 2 . . . 2; 3 . . . 3; 4 . . . 4", as shown, read the first four memory cells of Macro 0 occupied by the data. Since the read-write parallel protocol allows simultaneous reading and writing of different memory banks of the memory, for example, while writing Macro 0, the data of Macro 2 can be read at the same time, but simultaneous reading and writing of the same memory bank is not allowed, so one of the read and write transactions simultaneously addressing the same bank will be delayed. For example, while reading data "1 . . . 1; 2 . . . 2; 3 . . . 3; 4 . . . 4", when it is requested to write data "a . . . a; b . . . b; c . . . c" (hex representation) to an address within the range of 0x2000,0000~0x 2000,ffff, the write transaction has to wait for the completion of reading data, because simultaneous reading and writing on the same Macro will cause conflicts. Assuming that the memory completes a "transfer" data access every clock cycle, when the above read transaction and write transaction arrive at the same time, the write transaction needs to wait for at least 4 cycles (that is, the end of the read operation) until data "a . . . a; b . . . b; c . . . c" can be written to the specified address on Macro 0. When such read-write conflicts occur frequently, the overall read-write efficiency of the memory will be greatly reduced.

Figures 2, 3A:
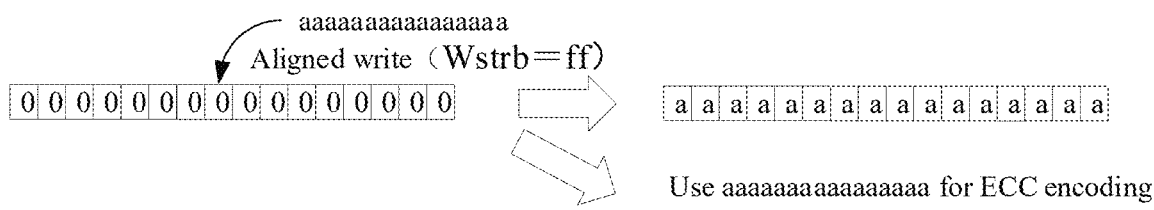
FIG. 2 shows an example of a memory implementation including multiple memory banks based on low address mapping according to the present disclosure.
FIGS. 3A-B show operation examples of aligned writes and unaligned writes, respectively.

The above problem can be solved by a specific low address decoding which mapping the incremented address to different memory banks so that concurrent read and write transactions can be staggered to different memory banks. FIG. 2 shows a memory implementation example including a plurality of memory banks based on low address mapping. As shown, the memory can also include four memory banks Macro 0~3, and each bank have the same storage capacity, for example, 128 k (i.e., 128 KB). Each bank also includes a plurality of memory units, such as the memory unit shown in the figure with a size of 64 bit (i.e., 8 byte), that is, the physical bit width of the bus communicating between the memory and the control unit (not shown in FIG. 2) is 64 bits, wherein the memory is the slave of the bus, and the control unit is the master of the bus.

For the consideration of aligning the physical bit width of the above-mentioned bus, consecutive logical address accesses are usually coded at intervals of 8 byte data (the minimum addressing unit of logical address is 1 byte data), for example, the low 8-bit of the 8 consecutive logical addresses are 0x00, 0x08, 0x10, 0x18, 0x20, 0x28, 0x30, 0x38. respectively (0x represents hexadecimal), and when the aforementioned logical address is represented by a binary number, the address bits of the low 8-bit [7:0] are: 0b'00000000, 0b'00001000, 0b'00010000, 0b'00011000, 0b'00100000, 0b'00101000, 0b'00110000, 0b'00111000 (0b' represents binary).

When the memory adopts a specific low address decoding, the Macro 0~3 no longer respectively correspond to 4 consecutive logical address ranges, but the continuous logical addresses are transmitted with a predetermined transmission bit width (for example, the address interval as shown is 8, since the minimum addressing unit of the logical address is 1 byte of data, 8 addressing units between 2 consecutive logical addresses means that the corresponding data interval is 8 bytes, that is, 64 bit data) and mapped to different memory banks in turn.

Specifically, the capacity of each of Macro 0~3 is 128 k, but in each Macro, the logical address between adjacent physical addresses is no longer a continuous address with an interval of 8 addresses, but a discontinuous address with an interval of 32 addresses address (Predetermined transmission bit width 8×number of memory banks 4=32). Therefore, when addressing four consecutive logical addresses (for example, the lower 8-bit address is expressed as 00, 08, 10, 18 in hexadecimal) to read data "1 . . . 1; 2 . . . 2; 3 . . . 3; 4 . . . 4 (hexadecimal representation)", with the specific low address decoding, in this embodiment is the low address bits [4:3], Macro 0, Macro 1, Macro 2, and Macro 3 are addressed respectively (in FIG. 2, Macro 0 corresponds to "00", Macro 1 corresponds to "01", Macro 2 corresponds to "10", and Macro 3 corresponds to "11"). Therefore, when the memory receives a request to read data of 4 increment address starting from logical address 0000, the read data channel can for example, read "1 . . . 1" stored on Macro 0 in the first clock cycle, read "2 . . . 2" stored on Macro 1 in the second cycle, read "3 . . . 3" stored on Macro 2 in the third cycle, and read "4 . . . 4" stored on Macro 3 in the fourth cycle, so the data can be combined into "1 . . . 1; 2 . . . 2; 3 . . . 3; 4 . . . 4 (hexadecimal representation)" according to the big-endian rule and read out.

When a request to read data of 4 increment address starting from logical address 00000 is received, at the same time as a request to write data "a . . . a; b . . . b; c . . . c" to 3 memory units starting from logical address . . . 1 . . . 01000 (corresponding to an address of Macro 0), read and write conflicts can be resolved according to specific rules. For example, in a simple implementation, it can be specified that always reads first, always writes first, or up to a threshold latency, always reads first or always writes first. In one embodiment, for read and write conflicts, an arbitration circuit can be used for conflict arbitration, and by delaying, for example, a write operation by one clock cycle (here, one clock cycle can be referred to as "one beat"), subsequent read and write operations can proceed smoothly. For example, the arbitration circuit can arbitrate a read transaction and a write transaction for the same memory bank in the same clock cycle, for example, the arbitration circuit can arbitrate the read transaction first (in other arbitration rules, it can also be a write transaction first), and make the write transfer in the write transaction delayed by one clock cycle, so that the subsequent read and write operations can be staggered for different memory banks when the logical addresses of the read and write operations are continuous. Therefore, the read data channel can still read "1 . . . 1" stored on Macro 0 in the first cycle, read "2 . . . 2" stored on Macro 1 in the second cycle, read "3 . . . 3" stored on Macro 2 in the third cycle, and read "4 . . . 4" stored on Macro 3 in the fourth cycle; meanwhile, write data channel can be delayed by a beat in the first clock cycle, and then write "a . . . a" to Macro 0 in the second cycle, write "b . . . b" to Macro 1 in the third cycle, and write "c . . . c" to Macro 2 in the fourth clock cycle. Thus, efficient read and write parallelism is realized through one-beat delay of the write transaction (that is, data read and write operations are simultaneously performed on different Macros during the second to fourth clock cycles). Of course, it should be understood that when a request to read the data of 4 units starting from logical address 00000 is received at the same time as a request to write "b . . . b; c . . . c" to 2 logical addresses starting from . . . 1 . . . 01000, there is no need to delay, because there is no reading and writing of the same memory bank in the same clock cycle.

It is worth noting that the foregoing embodiments all take the "predetermined transmission bit width" as an example of 64 bit. In other embodiments, other "predetermined transmission bit widths" can also be used, such as 32 bit (assuming that the bus physical bit width is 32 bit=4 byte), then the data interval between two consecutive logical addresses is 4 bytes of data, that is, there is an interval of 4 addressing units between two consecutive logical addresses (assuming that the addressing unit of the logical address is still 1 byte of data), then the "specific address low bit" is the address low data bit [3:2] (assuming that the memory still includes 4 memory banks).

In a memory that supports ECC encoding, due to unaligned write data that causes ECC re-encoding, a read-modify-write operation is required. The above-mentioned read-modify-write operation needs to read the original data of the write address, so it needs at least two beats to complete.

In the process of AXI data transfer, when the data bit width in this transfer is smaller than the data bit width of the channel itself, it is called narrow bit width transfer, or narrow transfer. In the narrow bit width write transfer, the master needs to inform the slave which bytes in the data channel are valid, and it needs to use WSTRB signal in the write data channel. A single bit in the WSTRB signal is set, indicating that the byte at the corresponding position is valid. For example, in the implementation of transmitting 64 bits (that is, 8 bytes) per beat, the WSTRB signal corresponds to 8 bits, and the bit value of a corresponding bit is used to indicate that the corresponding byte is valid. For example, when the value of the WSTRB signal is ff, it indicates that all 8 bytes are valid for aligned writing, and when the value is 0f, it indicates that the first 4 bytes of the currently written 8-byte data are invalid. In a read transfer, the operation logic of the slave is the same as that of the master in a write transfer, but the slave does not have a signal like WSTRB.

Figure 3B:
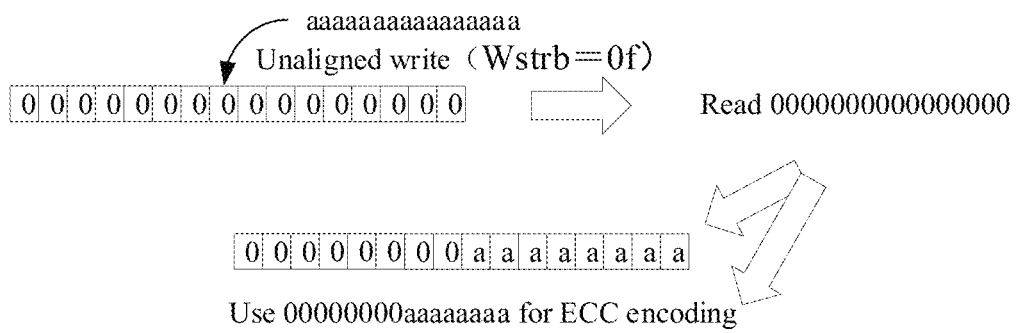

For ease of understanding, FIGS. 3A-B show operation examples of aligned write and non-aligned write, respectively. In order to avoid the illustration being too complicated, the figure shows an example of 64 bit data writing in hexadecimal. The data to be written "aaaaaaaaaaaaaaaa" shown in the figure actually corresponds to the 64-bit binary data "1010 . . . 1010", and the original data "0000000000000000" corresponds to the 64-bit binary data "0000 . . . 0000".

Specifically, FIG. 3A shows an example of aligned write. In the AXI protocol, for example, Wstrb is used to indicate the validity of the transmitted data, where wstrb=ff (i.e., wstrb=ob'11111111) indicates that all 8 bytes (i.e., 64 bit) data are valid. In this case, the 64-bit binary data "1010 . . . 1010" is directly written without concern for the value of the original data, and the written data is used for ECC encoding.

FIG. 3B corresponds to an example of unaligned write. In this case, since wstrb≠ff (wstrb=0f=ob'00001111), which indicates non-aligned write, that is, the transmitted 64-bit binary data "1010 . . . 1010" is only valid in the last 32 bits (in other embodiments, only the first 32 bits of data is transmitted). In this case, in order to perform overall ECC encoding on 64-bit data, an additional clock cycle is required to read the original data, that is, 64-bit binary data "0000 . . . 0000" (in other embodiments, only the first 32 bits of data is read)), and then, the original data and the data to be written can be spliced into "000000000aaaaaaaa" (that is, 64-bit binary data "0000 . . . 00001010 . . . 1010"), and data writing and ECC encoding can be performed in the next clock cycle.

In application scenarios where unaligned writes occur frequently, the above unaligned writes that require two clock cycles to complete will reduce the read and write efficiency of the memory. For this reason, the present disclosure proposes a method for improving memory read-write efficiency, by pre-reading a next incremental address in the current clock cycle to speed up the next possible encoding operation that requires additional rewriting, thereby improving the execution efficiency of the read-write parallel protocol. In the present disclosure, two clock cycles are still needed to complete the unaligned write encoding operation itself, but since the reading of the original data and the writing of the previous logical address occur simultaneously (in other words, the write operation of the current logical address and the original data read of a next logical address occur simultaneously), so the non-aligned write (especially the non-first non-aligned write in the write transaction) no longer requires an additional clock cycle for the original data read, but only takes one clock cycle. Further, in order to realize the pre-reading of the original data corresponding to the next logical address in the current write cycle, it is necessary that the increment address and the current address are not located in the same memory bank. Therefore, the high-order address mapping in which continuous logical addresses are located in the same memory bank shown in FIG. 1 cannot implement the incremental address pre-read operation proposed by the present disclosure, while the memory with low address mapping shown in FIG. 2 can implement the incremental address pre-read scheme of the present disclosure. In addition, it should be understood that, in addition to adopting an addressing scheme in which lower addresses are mapped to different memory banks, memory adopting other addressing schemes in which incremental addresses are located in different memory banks can also implement the incremental address pre-read scheme of the present disclosure. For example, as long as the pre-read and write to different memory banks can be performed in the same cycle, the pre-read scheme of the present disclosure can also be used for addressing schemes in which high-addresses are mapped to different memory banks.

Figure 4:
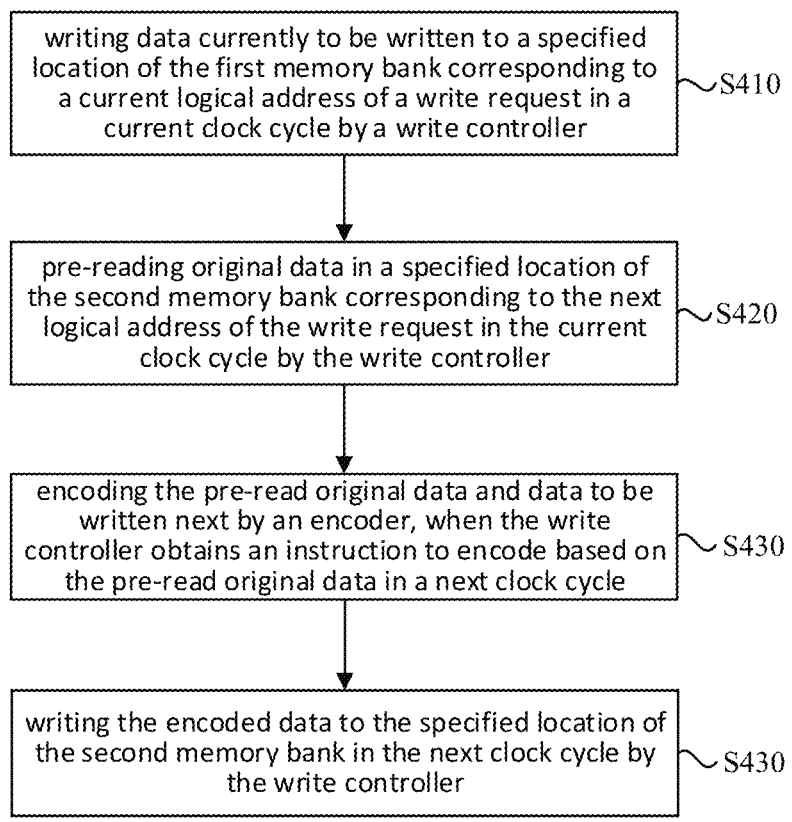
FIG. 4 shows a schematic flowchart of a memory operating method according to an embodiment of the present disclosure.

FIG. 4 shows a schematic flowchart of a memory operating method according to an embodiment of the present disclosure. A memory capable of implementing the memory operation method of the present disclosure follows a read-write parallel protocol (for example, the AXI protocol described in detail below) and includes multiple memory banks.

In step S410, writing data currently to be written to a specified location of the first memory bank corresponding to a current logical address of a write transaction in a current clock cycle by a write controller. In step S420, pre-reading original data in a specified location of the second memory bank corresponding to a next logical address of the write transaction in the current clock cycle by the write controller.

Although two steps S410 and S420 are used here to represent two operations in one clock cycle, namely, the write operation to the current logical address and the pre-read operation to the next incremental logical address, it should be understood that these two operations are actually carried out in the same clock cycle, and since the current logical address and the next logical address correspond to different memory banks (for example, the memory adopts low address mapping shown in FIG. 2), so the write and pre-read operations occurring in the same clock cycle do not conflict. In addition, although the "first" and "second" memory banks are used here to distinguish different memory banks, it should be understood that the first memory bank and the second memory bank are only used to represent one memory bank and another memory bank for write and pre-read operations in clock cycles, respectively.

Then in step S430, when the write controller obtains an instruction to encode based on the pre-read original data in a next clock cycle (for example, wstrb≠ff is read in this clock cycle, that is, unaligned write), encoding the pre-read original data and data to be written next of the write transaction by an encoder (for example, as shown in FIG. 3B, the ECC encoder encodes the original data and the data to be written as a whole). At the same time, in step S440, writing the encoded data to the specified location of the second memory bank in the next clock cycle by the write controller. At this point, since the data originally stored in the specified location has been read in step S420, the write controller can directly finish writing the content of the next logical address in the next cycle after step S410 without waiting for an additional clock cycle.

It should be understood that, when pre-reading the original data in step S420, the write controller does not know whether a non-aligned write will occur in the next clock cycle (this is because the wstrb signal for the next logical address write operation needs to come on the next clock cycle). Therefore, as long as the above pre-read function is turned on, the memory implementing the scheme of the present disclosure will speed up the next possible non-aligned write by pre-reading the next incremental address under the parallel read-write structure. Of course, in case that the next write is an aligned write, this pre-read is useless and will generate redundant power consumption. However, although the pre-read scheme will generate redundant dynamic power consumption and circuit overhead, it is still acceptable compared to performance improvement.

Specifically, in case that the pre-read in step S420 is performed, and the next clock cycle corresponds to a unaligned write (wstrb≠ff is received, for example wstrb=0f), the original data read in step S420 can be used, encode together with the data to be written in step S430; but when the next clock cycle corresponds to a normal write (for example, wstrb=ff is received), the original data read in step S420 can be directly ignored, and directly proceed data written without involving the encoding of the original data. The latter case corresponds to: when an instruction not to encode based on the pre-read original data is obtained in the next clock cycle, only the data to be written next is encoded by the encoder.

Figure 6:
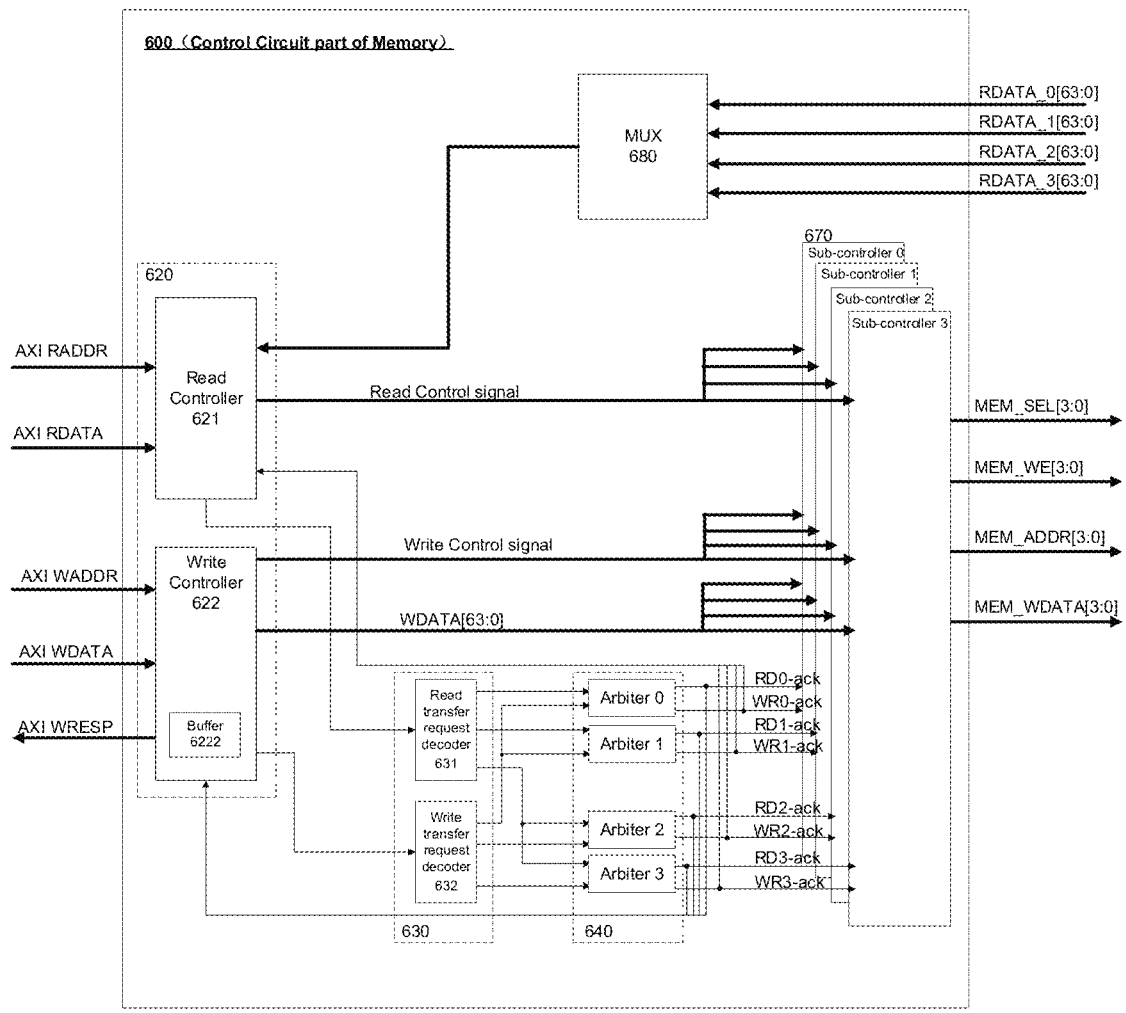
FIG. 6 shows a schematic composition diagram of a memory circuit conforming to the AXI protocol according to an embodiment of the present disclosure.

Here, the encoder that needs to use pre-read original data for encoding during non-aligned writing can be an ECC encoder, and the encoding mentioned in step S430 can be ECC encoding. In the case of ECC encoding, the encoding in step S430 can be performed on 8-byte data to generate additional ECC codes. For example, 8-byte data generates 1-byte ECC check code, and then all 9-byte data are written into the target memory band. Therefore, the internal WDATA [63:0] shown in FIG. 6 is actually a 9-byte wide WDATA [71:0], and the read data is also 9-byte wide, that is, RDATA [71:0]. However, among the 9-byte bit-width data to be written and read, only 8-byte data is the target data to be written or read, and the other byte of data is verification data for verifying the correctness of the accessed data. In other embodiments of the present disclosure, the pre-read original data can also be used for encoding other than ECC, for example the overall encoding algorithm such as CRC or Parity.

In addition, since the original data stored in the incremental address pre-read in the current cycle needs to be used for encoding (for example, ECC encoding) in the next cycle during non-aligned writing, therefore, to enable the pre-read function of the present disclosure, an additional pre-read data buffer needs to be set. Thus, the pre-read original data is put into the pre-read data buffer by the write controller in the current clock cycle, and is fetched from the pre-read data buffer by the encoder in the next clock cycle. Since the pre-read is performed under the control of the write controller, in a preferred embodiment, the pre-read data buffer can be located in the write controller (buffer 5222 shown in FIG. 5).

Further, since the pre-read scheme of the present disclosure is implemented under the read-write parallel protocol, the pre-read scheme of the present disclosure preferably includes a conflict resolution mechanism when conflicts occur between pre-read and normal memory read operations. In one embodiment, a read-first scheme can be employed. In this case, the read controller can inform the write controller of the memory bank corresponding to the current cycle of the read operation. In case that there is a conflict with the pre-read operation, the pre-read operation will be delayed. Specifically, sending an occupancy indication to the write controller by the read controller, for the write controller to determine whether to perform the pre-read operation in the current clock cycle, wherein the occupation indication indicates whether a read transaction is made to the second memory bank in the current clock cycle. In another embodiment, a pre-read-first scheme can be employed. In this case, the write controller can inform the read controller of the memory bank corresponding to the pre-read in the current cycle, and in case that there is a conflict with the normal read operation, the read operation will be delayed. Specifically, sending an occupancy indication to the read controller by the write controller, for the read controller to determine whether to delay the execution of a read operation of a current logical address of the read transaction in the current clock cycle, wherein the occupation indication indicates whether a pre-read operation is made to the second memory bank in the current clock cycle.

In addition, as mentioned above, the premise of being able to perform pre-read is that the incremental address of the write operation corresponds to a different memory bank, so the memory that implements the pre-read scheme of the present disclosure preferably uses low address mapping to ensure that the next write address is located in a different memory bank. In this situation, there still can be a conflict between the write operation itself and the read operation, so the operation scheme of the memory also needs to include a solution to read-write conflicts. While arbitrating can be done by simple read or write first rules as previously described, in a preferred embodiment an arbitration circuit can be introduced to arbitrate read-write conflicts.

In order to facilitate the understanding of the present disclosure, the pre-read scheme and read-write arbitration principle of the present disclosure will be described in conjunction with the memory module diagram as follows.

Figure 5:
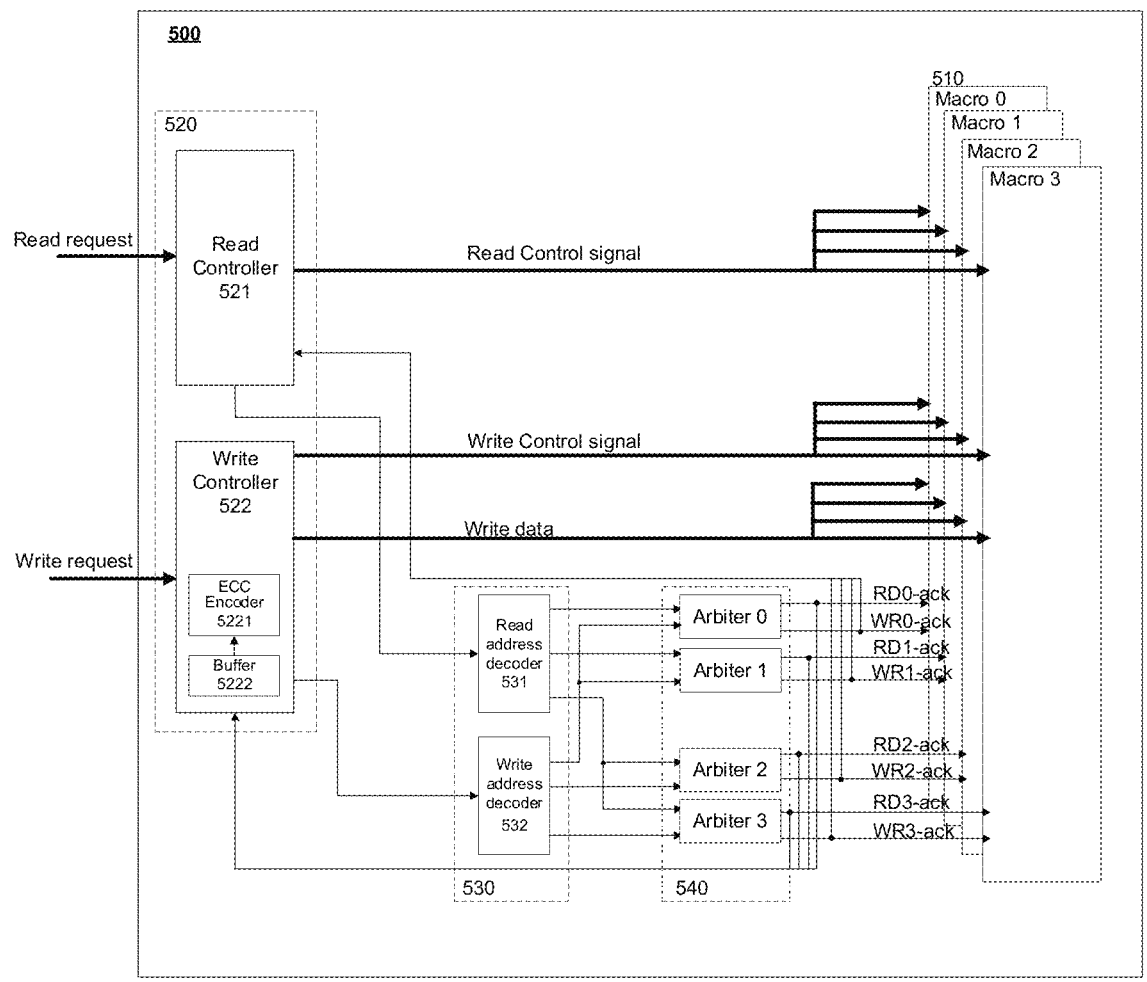
FIG. 5 shows a schematic composition diagram of a memory circuit according to an embodiment of the present disclosure.

FIG. 5 shows a schematic composition diagram of a memory circuit according to an embodiment of the present disclosure. The memory circuit 500 includes a plurality of memory banks 510, corresponding to Macros 0-3 as shown, and data access of the memory circuit 500 follows a read-write parallel protocol, such as the AXI protocol.

The memory circuit 500 includes a control circuit 520 and an address decoding circuit 530. The control circuit 520 is configured to control reading and writing, and the address decoding circuit 530 is configured to address the control signal to the physical address corresponding to the logical address.

Specifically, the control circuit 520 includes a read controller 521 and a write controller 522. The read controller 521 is configured to send a read control signal to the memory bank 510, and the write control 522 is configured to send a write control signal to the memory bank 510 and data to be written. In order to achieve parallel read and write, the address decoding circuit 530 can include a read address decoder 531 and a write address decoder 532. When performing the low address mapping shown in FIG. 2, the read address decoder 531 is configured to sequentially map the read transactions for consecutive logical addresses from the read controller 521 to different memory banks according to the predetermined transmission bit width. Correspondingly, the write address decoder 532 is configured to sequentially map the write transactions for consecutive logical addresses from the write controller 522 to different memory banks according to the predetermined transmission bit width.

If the specific low address bits of the logical address are the same, the read transaction and/or the write transaction are mapped to the same memory bank. In this case, the memory circuit 500 also needs to include an arbitration circuit 540 configured to arbitrate a read transfer and a write transfer to the same memory bank at the same clock cycle. The arbitration circuit 540 is configured to be connected between the address decoding circuit 530 and the memory bank 510, and before sending the read and write transactions output by the address decoding circuit 530 to a specific memory bank, it performs arbitration on whether to read or write first.

In order to implement ECC encoding, an additional ECC encoder is required. Since the ECC encoder is usually located inside the write controller 522, it is shown as encoders 5221 in FIG. 5. If the ECC encoder is located outside the write controller 522, it needs to be able to communicate with the write controller 522 to perform ECC encoding on the data to be written. In addition, since the original data stored in the incremental address pre-read in the current cycle needs to be used for encoding (for example, ECC encoding) in the next cycle during unaligned writing, therefore, to enable the pre-read function of the present disclosure, an additional pre-read data buffer is required. Since the pre-read is performed under the control of the write controller, in a preferred embodiment, the pre-read data buffer 5222 is located in the write controller 522 as shown in FIG. 5. Of course, it can also be located in other positions, and the present disclosure is not limited thereto.

The write controller 522 can be configured to: write the current data to be written to a specified position of the first memory bank corresponding to the current logical address of the write transaction in the current clock cycle; pre-read original data in a specified location of the second memory bank corresponding to the next logical address of the write transaction in the current clock cycle. Thus, the pre-read original data can be put into the pre-read data buffer 5222 by the write controller 522 in the current clock cycle, and can be fetched by the ECC encoder 5221 in the next clock cycle. Therefore, the ECC encoder 5221 can concatenate the data to be written and the original data to obtain the data actually stored in the corresponding address, and thus calculate the error correction code. Thus, the write controller 522 can write the encoded data to the specified position of the second memory bank in the next clock cycle.

The instruction to encode based on the pre-read original data comes from the bus signal received by the write controller, and the bus signal indicates that in the next clock cycle, the write transaction performs an unaligned write operation on the next logical address. The write controller obtains the next logical address for the pre-read by incrementing the current logical address in the current clock cycle.

It should be understood that although FIG. 5 shows an example in which the encoder is an ECC encoder 5221 inside the write controller, and the pre-read data buffer 5222 is located inside the write controller 522, in other embodiments, the encoder can perform encoding other than error correction code encoding, and the encoder and pre-read data buffer can be located outside of the write controller 522.

In the illustrated example, the arbitration circuit 540 includes a plurality of arbitration sub-circuits corresponding to a plurality of memory banks, that is, Arbiter 0 configured to arbitrate the read and write access of Macro 0, Arbiter 1 configured to arbitrate the read and write access of Macro 1, Arbiter 2 configured to arbitrate for read and write access of Macro 2, and Arbiter 3 configured to arbitrate for read and write access of Macro 3.

For example, when Arbiter 0 receives a read transaction for Macro 0 from read address decoder 521 and a write transaction for Macro 0 from write address decoder 522 at the same time in the current clock cycle, Arbiter 0 can, according to a predetermined arbitration rule, perform arbitration on whether Macro 0 performs a read transfer or a write transfer in the current clock cycle. As shown, when the arbitration result is to perform a read transfer, Arbiter 0 sends RD0-ack to Macro 0, that is, a read transfer notification for Macro 0; and when the arbitration result is to perform a write transfer, Arbiter 0 sends WR0-ack to Macro 0, that is, write transfer notification for Macro 0. Similarly, Arbiter 1~3 can also send RD-ack or WR-ack to Macro 1~3 respectively to inform the arbitration result.

Therefore, a read or write data transfer can be directly performed on the memory bank in the current clock cycle according to the arbitration result. In the implementation of using RD-ack or WR-ack to notify the arbitration result, the read control signal sent by the read control module 521 can be strobed by the memory bank that received RD-ack, for example, the memory bank Macro 1 that received RD-ack 1, and the write control signal and write data sent by the write control module 522 can be strobed by the memory bank that receives the WR-ack, for example, the memory bank Macro 0 that receives the RD-ack 0. Thus, parallel reading and writing of data (for different memory banks) can be completed in the current clock cycle.

In order to enable the normal execution of the delayed request based on the arbitration result, it is necessary to notify the control circuit 520 of the arbitration result, so that the delayed request can be transmitted at the next predetermined transmission bit width transmission time (usually the next cycle of the current clock cycle). Therefore, when the arbitration circuit 550 arbitrates a read transaction first or a write transaction first for a certain memory bank in the current clock cycle, the arbitration circuit 550 can notify the control circuit 520 of the arbitration result, and can only notify the read control module or the write control module, and notify both. Correspondingly, the read control module or write control module corresponding to the non-first request re-sends the non-first request in the next clock cycle. For example, there are a read transaction and a write transaction for Macro 0 simultaneously in the current clock cycle, Arbiter 0 sends RD0-ack to Macro 0, and Macro 0 receives a read control signal from read control module 521 and executes a read operation. Meanwhile, the RD0-ack can be sent to the write control module 522, so that the write control module 522 knows that the write control signal and the write data sent by the Macro 0 in the current clock cycle are not processed by the Macro 0, so in the next clock cycle, the write control module 522 re-sends the write control signal and write data delayed in the current cycle.

The arbitration circuit can perform arbitration according to a predetermined arbitration rule. For example, since the write operation may include time delay, when there are a read transaction and a write transaction for the same memory bank in the current clock cycle, the arbitration circuit will arbitrate the read transaction first.

In addition, in order not to delay a certain type of request for too long, when there are a read transaction and a write transaction for the same memory bank in the current clock cycle, the arbitration circuit arbitrates the request of a different type from the data transfer in the previous clock cycle. For example, when the arbitration sub-circuit for a certain memory bank did not make a read/write arbitration in the previous clock cycle, it can arbitrate the read transaction first in the current clock cycle; while, when a read/write arbitration has been made in the previous clock cycle, the arbitration sub-circuit no longer simply arbitrates the read transaction first in the current clock cycle, but a type different from the previous arbitration first. That is, in case that a write operation is arbitrated in the previous clock cycle, a read operation is arbitrated in the current clock cycle; in case that a read operation is arbitrated in the previous clock cycle, a write operation is arbitrated in the current clock cycle. In some embodiments, the arbitration subcircuit can also arbitrate a read transaction or a write transaction came alone, for example, when only a read transaction is received, the arbitration arbitrates the read operation first and sends RD-ack; only when a write transaction is received, the arbitration arbitrates the write operation first and sends a WR-ack.

The above arbitration rules are especially applicable to the case of arbitration at a smaller granularity, for example, each transfer in the AXI protocol is arbitrated once, thereby maximizing the parallelism rate of read and write operations.

In order to further illustrate the principle of the present disclosure, the memory circuit shown in FIG. 6 follows the AXI protocol. Further, the memory circuit 600 also shows a sub-controller circuit 670 connected between the control circuit and the memory banks and a multiplexing circuit (MUX) 680 (ECC encoder is not shown in FIG. 6). The sub-control circuit 680 includes a plurality of sub-controllers 0-3, and each sub-controller is configured to control data writing and reading of a memory bank.

The AXI bus is connected between the master and the slave. The memory circuit in the present disclosure acts as a slave in the AXI protocol, receiving instructions from the master (e.g., CPU/DMA controller and other modules that need to access the memory 500) to perform data read or write operations. The AXI bus has 5 independent channels, which are write address (AXI WADDR) channel, write data (AXI WDATA) channel, write reply (AXI WRESP) channel, read address (AXI RADDR) channel, and read data (AXI RDATA) channel. Among them, the three channels (write address, write data and write reply) can interact with the write controller 622 in the control circuit 620, and the read address and read data channels can interact with the read controller 621 in the control circuit 620. Each channel supports bidirectional signaling for handshaking.

These five channels are independent of each other, but share a set of VALID/READY handshake mechanism to realize the transmission of information. The VALID/

READY mechanism is a bidirectional flow control mechanism, which enables both the sender and the receiver to control the transmission rate. In the handshake mechanism, the communication parties act as the sender (Source) and the receiver (Destination) respectively, and the operations of the two are different. The sender sets the VALID signal high to indicate that the sender has already prepared the data, address or control information and kept them on the message bus. The receiver sets the READY signal high to indicate that the receiver is ready to receive. When the VALID/READY signals of both parties are high at the same time, a data transmission is completed on the rising edge of the clock ACLK. After all the data is transmitted, both parties simultaneously de-assert their own signals.

Figure 7A:
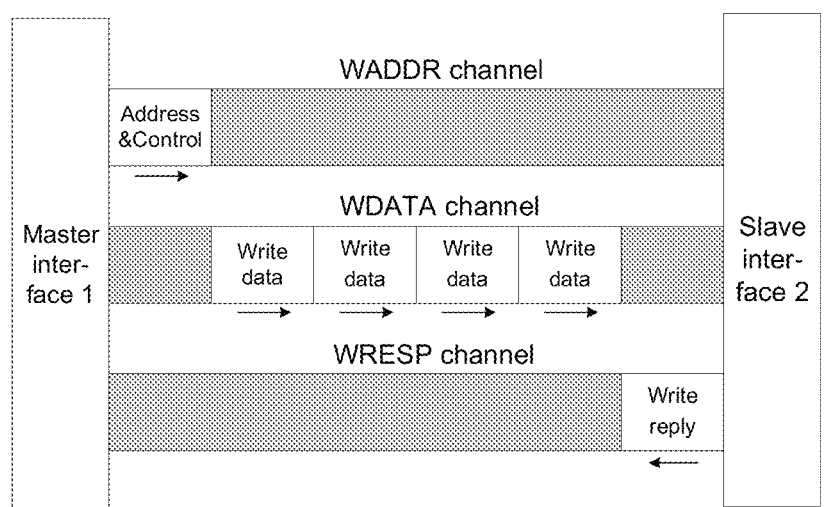
FIGS. 7A-B show schematic diagrams of channels in a write transaction and a read transaction in the AXI protocol.
Figure 7B:
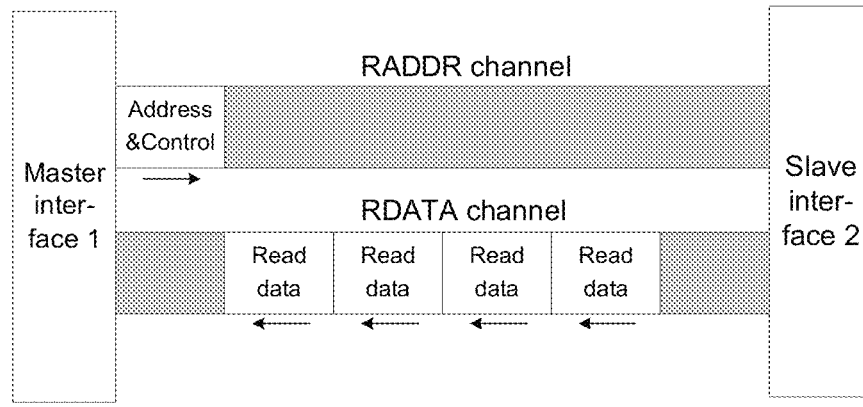

The unit of information exchange between the master and the slave is a "transaction". FIGS. 7A-B show schematic diagrams of channels in a write transaction and a read transaction in the AXI protocol. The master interface 1 shown can be, for example, an interface where a CPU is connected to a bus, and the slave interface 2 can be an interface where a memory circuit is connected to a bus.

First, FIG. 7A shows operations on three channels in a write transaction. As shown, the master first informs the slave of the characteristics of this transaction on the write address (WADDR) channel, including the write address of the data to be written and control information. Subsequently, the master can write data to the slave in the write data (WDATA) channel, and one transaction operation can include multiple data transfers, corresponding to multiple write data blocks shown in the figure.

After receiving all the write data of this transaction, the slave will notify the master of the response of this transaction operation through the write reply (WRESP) channel. The master receives the response signal from the slave as a sign of the end of this transaction. Write reply is for the whole transaction, not for each transfer. Writing data usually occurs after the write address operation, but the AXI protocol allows data to be written first or write data and address in the same clock cycle.

FIG. 7B shows operations on two channels in a read transaction. As shown, the master writes the address of the data to be read and control information in this transaction on the read address (RADDR) channel. After receiving the address, the slave transmits the data at the address to the master through the read data (RDATA) channel. It should be understood that the read address (RADDR) channel is still written by the master, but the content written is the address of the data to be read.

Since the transmission direction of the read data channel is from the slave to the master, the slave can directly use the read data channel for read reply after the read operation is completed, so there is no need for a separate read reply channel.

In the field of data transmission, "burst" refers to a transmission mode that continuously transmits multiple (adjacent addresses) data within a period of time. All interactions between two AXI components (master and slave shown in FIGS. 7A-B) to transfer a set of data are called AXI transactions. In an AXI transaction, data is organized in bursts. A burst can contain one or more transfers. Each transfer is also called a beat data because it uses one clock cycle. After the handshake signal between the two parties is ready, complete a transfer every cycle, so a AXI transfer is also called a AXI beat, or one beat data.

When the memory circuit of the present disclosure performs data transfer according to the AXI protocol, the predetermined transmission bit width can be set to a data size that can be transmitted in one transfer, for example, 8 bytes, i.e., 64 bits.

In a burst, the master can write information such as the start address and the length of the burst, and the slave will start from the start address and receive the write data transmitted by the master in turn, or read the data on consecutive addresses as read data to transmit to the master. Therefore, as shown in FIGS. 7A and 7B, one transaction includes one address and control information (Address & Control) and multiple data transfers.

In the whole transaction, the master first transmits control information and the address of the first byte of data (which is called the start address) for the next burst to the slave. During the subsequent transfer of this burst, the slave will calculate the address of the subsequent data according to the control information. Control information and start address are transmitted on the read/write address channel.

The control information transmitted in the address channel includes three burst-related signals. The control information in read and write address channels are consistent, thus the signals related to burst in the read address channel are described here.

(1) AxLEN (burst length): refers to the number of data transfers contained in a burst, which is controlled by the AxLen signal in the protocol. The AxLen signal in the protocol starts from zero, and the actual length value is AxLen+1.

(2) AxSIZE (burst size): refers to the data bit width in transmission, specifically, the number of bytes of data transmitted per cycle, which is controlled by the AxSIZE signal in the protocol. The data width of a burst cannot exceed the bit width of the data bus itself.

(3) AxBURST (Burst type), which is divided into 3 types, namely FIXED, INCR and WRAP. Use 2-bit binary representation.

The FIXED type is suitable for FIFO and cache application scenarios, and the most commonly used INCR type and WRAP type are used in this disclosure. In the INCR type and WRAP type, the address of the subsequent data is incremented on the basis of the start address, and the increment can usually be set to be the same as a transfer width (the WRAP type will loop back when it exceeds the boundary).

In order to perform efficient data access under the AXI protocol, the memory circuit of the present disclosure can set the predetermined transmission bit width to be the same as the data unit that can be transmitted by one AXI data transfer, that is, the maximum data that can be transmitted by one AXI data transfer (considering the existence of narrow bit width transfer). While the arbitration circuit performs read and write arbitration for each memory bank during each AXI data transfer. As a result, the master's access to continuous logical addresses changes to access different memory banks one by one. In the following examples of the present disclosure, it can be assumed that one AXI data transfer corresponds to a 64-bit (i.e., 8-byte) signal of one memory unit, i.e., the same as the predetermined transmission bit width.

Since under the AXI protocol, the read or write instruction from the master takes the form of start address+length to indicate the logical address to be accessed, so the address decoder can first determine which Macro the first transfer want to access through the target low address bits of the start address, and then perform address decoding by incrementally access different Macros one by one.

For example, when the slave receives the start address [4:3] from the WADDR channel as 10 (corresponding to Macro 2), and the control information includes INCR 4 (that is, the burst type is read address increment, and includes 4 transfers) instructions, the decoder can decode according to [4:3] of the start address, and increment the memory bank corresponding to the subsequent transfer one by one, so that the first transfer corresponds to Macro 2, and the second transfer corresponds to Macro 3, the third transfer corresponds to Macro 0, and the fourth transfer corresponds to Macro 1.

In addition, since the write address cannot be known in advance, the pre-read operation of the present disclosure cannot be performed on the first transfer. When writing in the first transfer, since the second transfer is known to correspond to Macro 3 according to the mapping rule of the increment address, pre-read can be performed on Macro 3 at the same time; while doing the second transfer write on Macro 3, pre-read on Macro 0; while doing the second transfer write on Macro 0, pre-read on Macro 1. Since the transaction ends after the fourth transfer, pre-read is not performed while doing the second transfer write on Macro 1.

The write address decoder can be implemented as the write transfer request decoder 632 shown in FIG. 6, which is configured to decode write transaction for each transfer. Thus, the write address decoder sequentially maps consecutive write transactions for logical addresses to different memory banks with a predetermined transfer bit width includes: The write transfer request decoder 632 determines the memory bank to be accessed initially according to the value of the specific low address bit of the start address in the write transaction, and incrementally determines the memory bank to be accessed by subsequent transfers one by one according to the transfer length information of the write transaction. Similarly, the read address decoder can be implemented as the read transfer request decoder 631 shown in FIG. 6, which is configured to decode read transaction of each transfer. Thus, the read address decoder sequentially maps read transactions of consecutive logical addresses to different memory banks with a predetermined transmission bit width include: read transfer request decoder 631 determine the memory bank to be accessed initially according to the specific low address bits of the start address in the read transaction, and incrementally determine the memory bank to be accessed in subsequent transfers one by one according to the transfer length information of the read transaction. Therefore, the memory circuit of the present disclosure realizes the staggered read and write operations for different memory banks in a burst transaction of multi-data transfers through an address mapping (mapped memory) strategy. In this strategy, consecutive logical addresses are alternately mapped to multiple memory banks in a unit of the data size that can be transmitted in one data transfer.

The memory circuit 600 is especially suitable to be implemented as an on-chip SRAM, and the modules 620, 630, 60, 670 and 680 shown in FIG. 65 can be regarded as a control circuit of the on-chip SRAM. The numbers 0~3 in the right signal MEM_SEL[3:0], MEM_WE[3:0], MEM_ADDR[3:0] and MEM_WDATA[3:0] of the sub-control circuit 670 represent four sub-controllers 0~3, all of which are signals that conform to the timing of the SRAM read and write interface. These signals are sent by the sub-controller to the corresponding memory bank (i.e., Macro 0~3), so that it can complete efficient read and write under the control of the read and write control circuit 620 and the arbitration of the arbitration circuit 640. MUX 680 can multiplex (because at most one Macro performs data read operation per clock cycle) the read data returned by memory bank Macro 0~3 (the data returned by Macro 0~3 correspond to RDATA_0 [63:0], RDATA_1 [63:0], RDATA_2 [63:0], RDATA_3 [63:0] in the figure) for multiplexing, and return to the read controller 621. The read controller 621 can return the read data to the master (utilize channels other than the five AXI channels shown on the left side of FIG. 6).

The AXI protocol supports address unaligned transfer, allowing the first byte address of a burst (that is, the start address) to be misaligned with the burst bit width. Therefore, pad data can be added to the first data transfer, the first transfer is padded to alignment, and the pad data is marked as invalid using the WSTRB signal.

Thus, in a preferred embodiment, the memory operation method (preferably the memory access management method) of the present disclosure is decoded by aligning the lowest two addresses of 64 bit, i.e. addr[4:3], thereby realizing simultaneous access to consecutive read and write addresses. When the read and write addresses are discontinuous and the lowest two addresses aligned to 64 bit do not conflict, they can be accessed in parallel. When the address conflicts, the read is usually not affected, and the write can also be accessed in parallel with the read after being blocked for a beat.

The minimum unit of arbitration of each arbitration sub-unit shown in FIG. 6 is a transfer, that is, each transfer performs arbitration. In one embodiment, arbitration can be conducted based on the following arbitration rules:

When there is no read/write response in the previous beat, then when there is a read transfer request or a write transfer request in this beat, the read or write transfer request for this beat will be responded;

When there is no read/write response in the previous beat, then when there is a read transfer request and a write transfer request in this beat, the read transfer request will be responded in this beat;

When in the previous beat read has been responded, then in this beat the write transfer has high priority; similarly, when in the previous beat the write transfer has been responded, then in this beat, the read transfer has high priority.

In addition, since the present disclosure is a scheme involving pre-read, in addition to read-write arbitration, it is also necessary to include a conflict resolution mechanism when conflicts occur between pre-read and normal memory read operations. In one embodiment, a read-first scheme can be employed. In this case, the read controller can inform the write controller of the memory bank corresponding to the current cycle of the read operation. In case that there is a conflict with the pre-read operation, the pre-read operation will be delayed. In another embodiment, a pre-read first scheme can be adopted. In this case, the write controller can inform the read controller of the memory bank corresponding to the pre-read in the current cycle, and in case that there is a conflict with the normal read operation, the read operation will be delayed.

In other words, the read controller in the memory that implements the pre-read scheme of the present disclosure can be configured to: send an occupancy indication to the write controller, for the write controller to determine whether to perform the pre-read operation in the current clock cycle, wherein the occupation indication indicates whether a read transaction is made to the second memory bank in the current clock cycle (corresponding to read first); or receive an occupancy indication sent by the write controller, and determining whether to delay the execution of a read operation of a current logical address of the read transaction in the current clock cycle, wherein the occupation indication indicates whether a pre-read operation is made to the second memory bank in the current clock cycle (corresponding to pre-read first).

Different embodiments of the present disclosure will be described below with reference to AXI timing diagrams in FIGS. 8-11.

Figure 8:
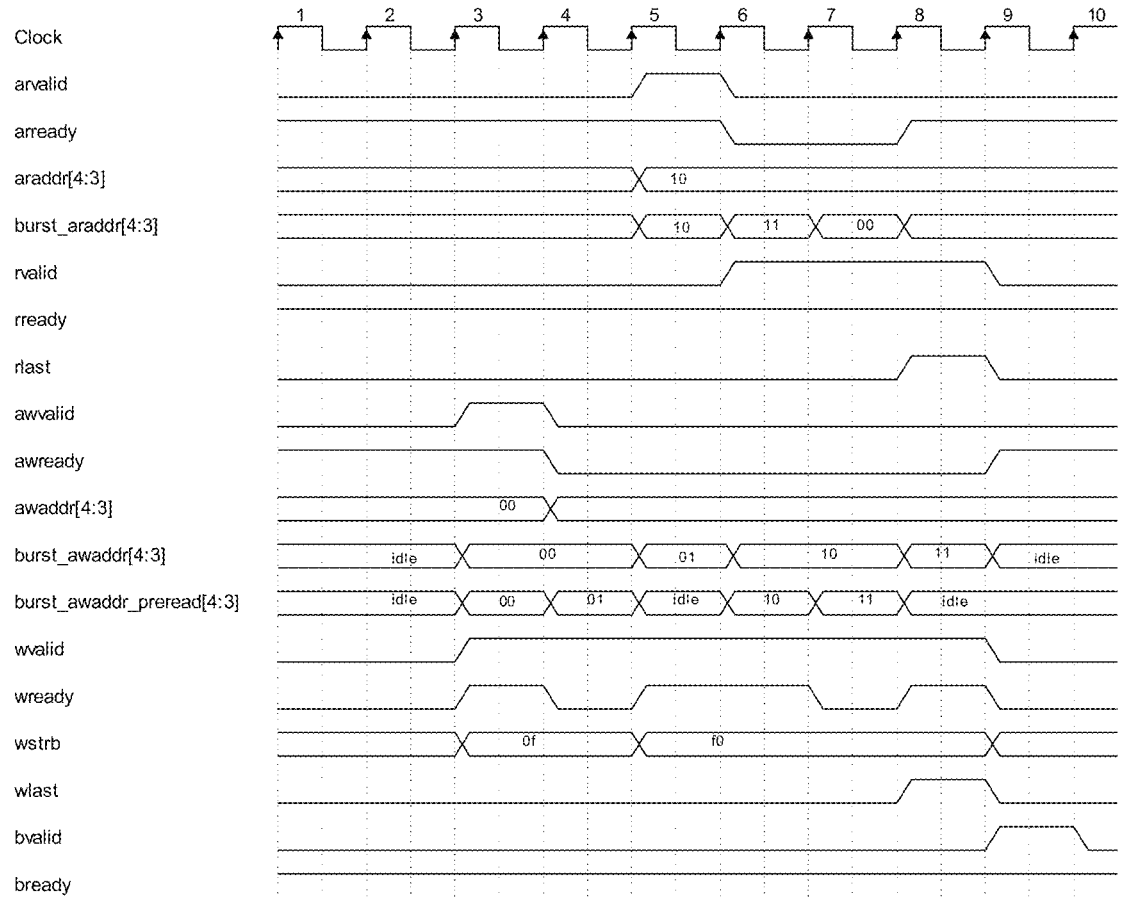
FIG. 8 shows an example of a timing diagram for AXI parallel read and write operations including pre-read operations according to the present disclosure.

FIG. 8 shows an example of a timing diagram for AXI parallel read and write operations including pre-read operations according to the present disclosure. In the example of FIG. 8, when the pre-read conflicts with the read, the read first scheme is adopted.

The AXI write channel (WADDR) receives a burst transfer instruction of INCR4 (that is, data written to 4 consecutive memory units with logical addresses starting from the specified start address, that is, the current transaction includes 4 write transfers), and the AXI read channel (RADDR) receives a burst transfer instruction of INCR3 (similarly, the current transaction includes 3 read transfers).

Clock indicates the bus clock. As shown, the write transaction comes before the read transaction. The master (for example, CPU) gives the awvalid signal in the write address channel (WADDR channel), and the slave (for example, the memory of the present disclosure) gives the awready signal in the write address channel, both of which are high at the same time (on the rising edge of the $3^{rd}$ beat) indicates that the write address channel handshake is successful. Since in the $3^{rd}$ beat, the memory pulls wvalid high to indicate that the write data is ready, and the master also sets wready high, so the handshake of the write data channel (WDATA) is completed at the same time on the rising edge of the $3^{rd}$ beat. Also in the $3^{rd}$ beat, the write address decoder addresses Macro 0 according to the value 00 of awaddr[4:3] (according to the addressing rules, it means the burst_awaddr[4:3] corresponding to the first transfer is 00, and the burst_awaddr[4:3] corresponding to the last three transfers are 01, 10 and 11 respectively).

AXI's write transaction defaults to "aligned write" in units of 64 bit, corresponding to wstrb is ff. When wstrb is other values, it indicates that only part of the currently transmitted 64 bit (8 bytes) data is valid. The write transaction shown includes 4 write transfers, all of which are unaligned writes. The wstrb corresponding to the first transfer is 0f, indicating that the last 4 bytes are valid, that is, only the lower 4 bytes of data need to be rewritten; the wstrb corresponding to the last three transfers is f0, indicating that the first 4 bytes are valid, that is, only the data of the upper 4 bytes need to be rewritten.

When the ECC function is enabled on the memory, the ECC encoding will only rewrite a few bits, but it needs to re-encode the 64 bit as a whole, which requires read-modify-write. If wstrb indicates unaligned write, because the macro port is serial and cannot be read and written at the same time, an extra beat is required for processing in the prior art. However, in the implementation of the present disclosure, transfers other than the first transfer can be pre-read, so that an unaligned write actually needs one beat.

As shown, data transmission begins when the two channels handshake successfully in the $3^{rd}$ beat. However, since the wstrb value of the $3^{rd}$ beat is 0f, indicating that the first transfer is an unaligned write, wready is pulled down by one beat at the $4^{th}$ beat (since it is the first transfer, pre-reading cannot be performed), through a conventional two-beat read-modify-write operation to complete the data writing of the first transfer (burst_awaddr[4:3] is 00, that is, the address is on Macro 0; although the pre-read address burst_awaddr_preread[4:3] is also 00 at this time, but "pre-reading" is not performed), and the transmission for the second transfer in INCR4 is performed on the $5^{th}$ beat.

However, at the same time that the first transfer data is written on Macro 0 for burst_awaddr[4:3] in the $4^{th}$ beat, the increment address can be pre-read (that is, when the write address of the beat is 00 plus 8 addressing units is equal to 01, corresponding to the burst_awaddr_preread[4:3] shown is 01), that is, the original data on Macro 1 is read in advance for the second transfer write address in the $4^{th}$ beat. Therefore, in the $5^{th}$ beat, although wstrb is f0 and indicates unaligned writing, since the original data has been read, the write operation of the second transfer on Macro 1 can be completed in one beat, and in the $5^{th}$ beat complete the corresponding ECC code calculation (not shown in the figure).

Also in the $5^{th}$ beat, a read transaction begins. The master (for example, CPU) gives an arvalid signal on the read address channel (RADDR channel), and the slave (for example, the memory of the present disclosure) gives an arready signal on the read address channel, both of which are high at the same time (on the rising edge of the $5^{th}$ beat) Indicates that the read address channel handshake is successful. The memory then pulls rvalid high at the $6^{th}$ beat to indicate that the read data is ready.

In the $5^{th}$ beat, the read address decoder addresses Macro 2 according to the value of araddr[4:3] to 10 (according to the addressing rules, it means that the burst_araddr[4:3] corresponding to the first transfer is 10, the burst_araddr[4:3] corresponding to the last two transfers are 11 and 00 respectively). When there is no conflict with the normal read, in the $5^{th}$ beat, the write controller tries to pre-read the data corresponding to the address of the third transfer, that is, it also tries to access Macro 2.

In the read-first scheme adopted in FIG. 8, the pre-read operation is delayed when there is a conflict with the read operation. This means that when the read controller indicates that the current clock cycle does not perform a read transaction on the second memory bank, the write controller performs the pre-read on the original data at the specified location of the second memory bank in the current clock cycle (corresponding to the pre-read for the second transfer that occurred at the 4th beat); and when the read controller indicates the current clock cycle to perform a read transaction on the second memory bank, the write controller do not perform a pre-read operation in the current cycle, and the next write becomes a normal write operation, i.e., one-beat aligned write or two-beat unaligned write.

As shown in FIG. 8, as read first, the read controller informs the write controller that it will access Macro 2 at the $5^{th}$ beat, and pre-reading cannot be performed, corresponding to the burst_awaddr_preread[4:3] shown in the figure is idle. At the $6^{th}$ beat, the read controller informs the write controller to access Macro 3. Since wstrb≠ff indicates unaligned writing, the write controller instructs to read the original data stored in Macro 2, and completes the write of the third transfer in the $7^{th}$ beat. This corresponds to: when the next clock cycle obtains an instruction that needs to be encoded based on the pre-read original data (for example, wstrb≠ff), then perform a conventional two-beat non-aligned write operation. That is: reading original data in the specified location of the second memory bank in the next clock cycle (the $6^{th}$ beat in this example) by the write controller; encoding the read original data and the data to be written next in a second next clock cycle (the second next clock cycle is a clock cycle next to the next clock cycle, the $7^{th}$ beat in this example) by the encoder; and writing the encoded data to the specified location of the second memory bank in the second next clock cycle by the write controller (the 7$^{th}$ beat in this example). In this case, the conventional two-beat "read-modify-write" is performed, and the "pre-read" is not performed. In addition, although such an example is not shown in the figure, when the next clock cycle obtains an indication that does not need to be encoded based on the pre-read original data (for example, wstrb=ff), then a regular write operation with a duration of one beat is performed in this clock cycle.

Subsequently, since there is no conflict between reading and writing, the read transaction and the write transaction proceed smoothly respectively. The read transaction completes the reading of three transfers in the 7$^{th}$ beat, and pulls up rlast in the 8$^{th}$ beat to give a signal that the execution of the INCR3 of the read operation is completed. Also at the 7$^{th}$ beat, the write transaction completes a two-beat conventional unaligned write operation, and starts pre-reading the data in the address corresponding to the 4$^{th}$ transfer, and completes the write at the 8$^{th}$ beat. In the 8$^{th}$ beat, the wlast signal indicates the end of the write transfer, so no pre-reading is performed in this beat to reduce power consumption. bvalid is the handshake signal given by the slave on the write reply (WRESP) channel, usually set immediately after wlast (e.g. the 9$^{th}$ beat). The master's bready on the write reply (WRESP) channel is always high, indicating that the current transaction has been completed, and the master is ready to start sending the next write instruction after bvalid is high.

Therefore, in the example in FIG. 8, the read transaction of three transfers completes data reading within 3 beats, while the write transaction of four transfers (including four unaligned writes) takes 6 beats to complete (the first transfer cannot be pre-read, and the third transfer is delayed by a beat due to conflicts with the read), compared with the conventional two-beat method (requiring a total of 8 beats), it takes two less clock cycles.

Figure 9:
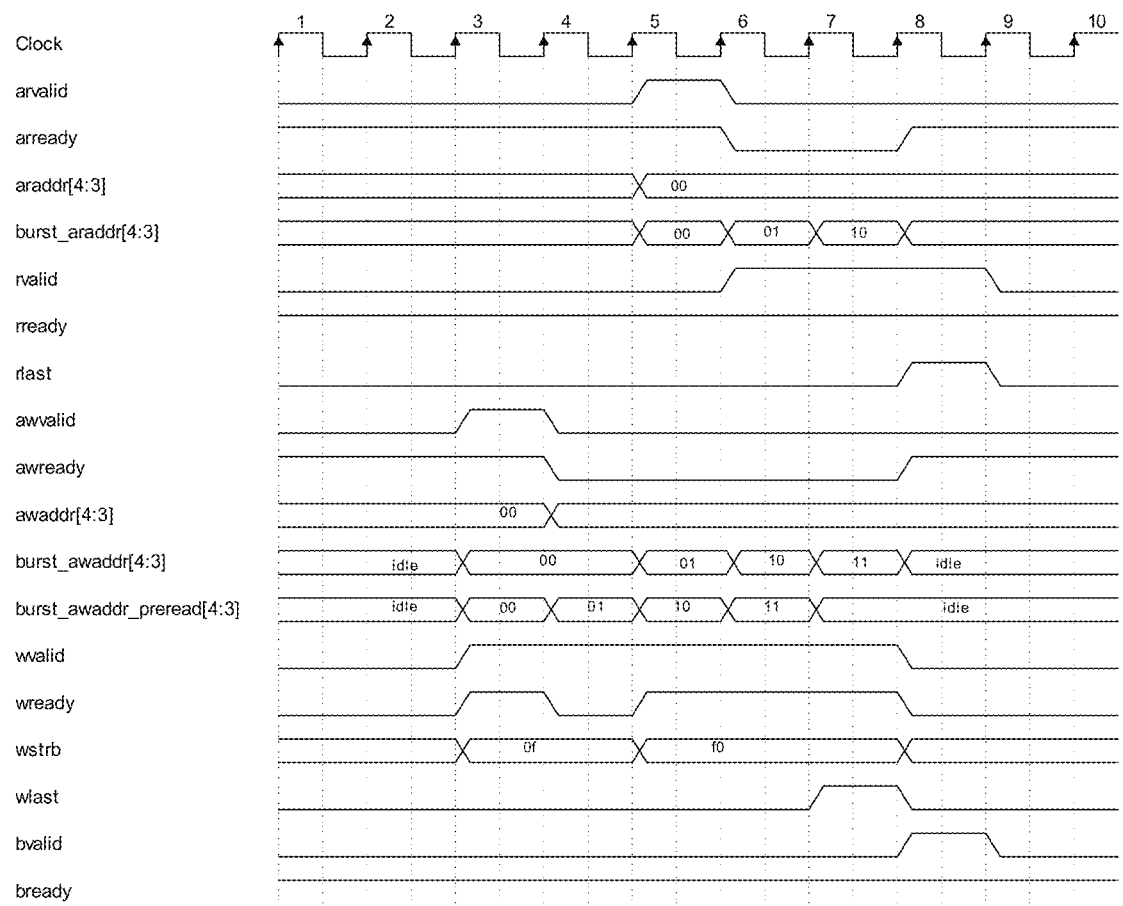
FIG. 9 shows an example of a timing diagram for AXI parallel read and write operations which includes pre-read operations according to the present disclosure.

FIG. 8 shows an example of a conflict between reading and pre-reading. When no conflict occurs, the efficiency of the pre-read scheme of the present disclosure will be higher. FIG. 9 shows an example of a timing diagram for AXI parallel read and write operations including pre-read operations according to the present disclosure. Similar to FIG. 8, FIG. 9 also shows an example in which the write instruction of INCR4 is received in the 3$^{rd}$ beat and the read instruction of INCR3 is received in the 5$^{th}$ beat, the difference is that the start address of the read transaction corresponds to raddr[4:3] is 00, so there is no conflict between reading and writing, as well as reading and pre-reading, during the respective read and write operations. In this case, the pre-read scheme of the present disclosure takes two beats for the first transfer unaligned write, and the following three transfer unaligned writes are all completed in one beat through pre-reading, realizing the completion of 4 unaligned write transfers in 5 beats. As a result, compared with the conventional two-beat method (a total of 8 beats are required), it takes three less clock cycles.

Figure 10:
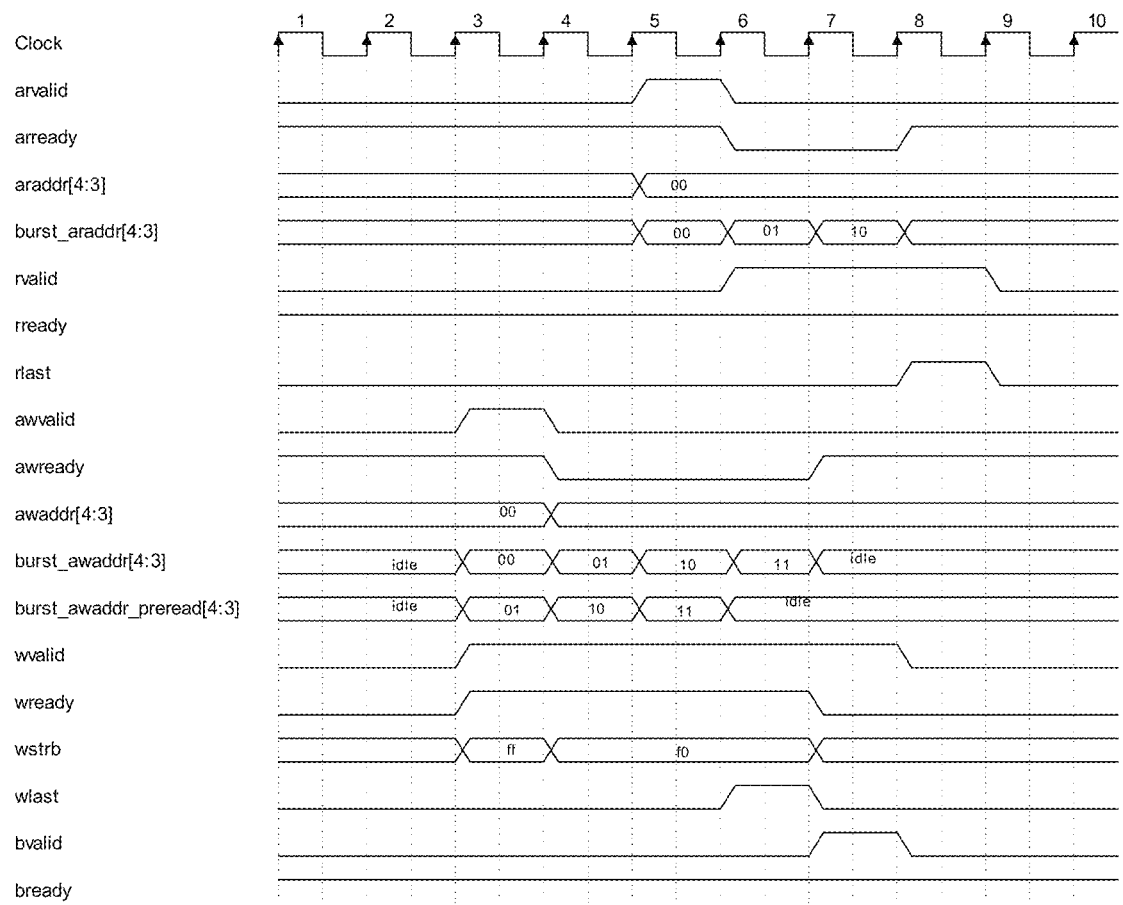
FIG. 10 shows an example of a timing diagram for AXI parallel read and write operations which includes pre-read operations according to the present disclosure.

FIG. 10 shows an example of a timing diagram for AXI parallel reading and writing including pre-reading operations according to the present disclosure. Further, it shows the case where the first transfer is not an unaligned write.

Similar to FIG. 9, FIG. 10 also shows an example in which the write instruction of INCR4 is received at the 3$^{rd}$ beat and the read instruction of INCR3 is received at the 5$^{th}$ beat, t the difference is that the figure shows the case where the first transfer is not an unaligned write. Therefore, for the write transaction, the write operation of the first address (the write address burst_awaddr[4:3] is 00) and the pre-read operation of the next incremental address (pre-read address burst_awaddr_preread[4:3] is 01) can be performed in the first beat (that is, the 3$^{rd}$ beat in the figure). Since the second transfer is an unaligned write (in the 4$^{th}$ beat, wstrb=0f, that is, the lower 4 bytes of burst_awaddr[4:3]=01 are partially written), the process of modifying and writing in the "read, modify and write" operation can be directly performed in the 4$^{th}$ beat (as shown, wready will not be pulled down in the 5$^{th}$ beat), regardless of whether this beat is unaligned or not, it will read the data of the next incremented address, that is, it will pre-read the next incremented address during the write beat. Repeat the above process until the current beat is a wlast beat, and no pre-reading will be performed in the wlast beat to reduce power consumption.

Figure 11:
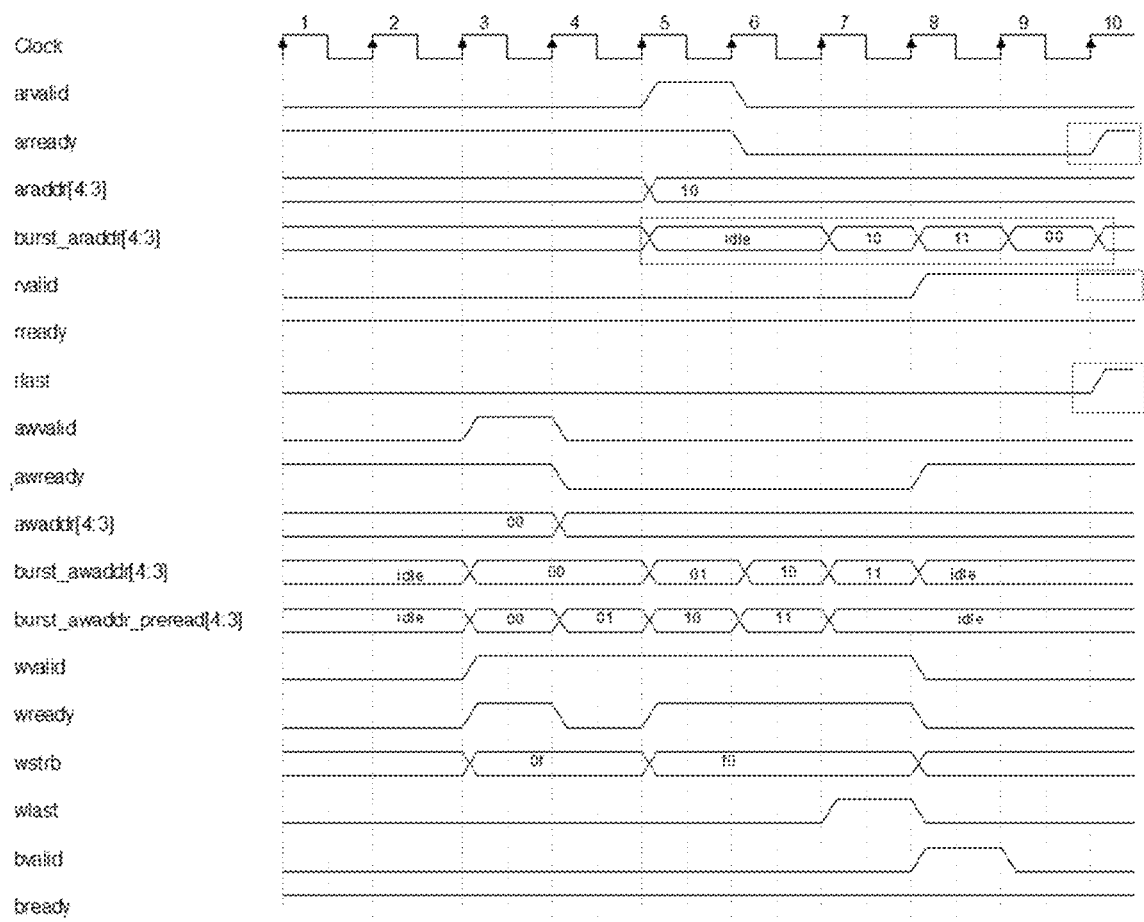
FIG. 11 shows an example of a timing diagram for AXI parallel read and write operations which includes pre-read operations according to the present disclosure.

An example of the read first scheme when read and pre-read conflicts are introduced above with reference to FIGS. 8-10. FIG. 11 shows an example of a timing diagram for AXI parallel reading and writing including pre-read operations according to the present disclosure. Similar to FIG. 8, FIG. 11 also shows an example of receiving the write instruction of INCR4 in the 3$^{rd}$ beat and the read instruction of INCR3 in the 5$^{th}$ beat. The difference lies in the different schemes adopted when conflicts between reading and pre-reading occur. In the example of FIG. 11, a pre-read first scheme is used.

As shown, in the 5$^{th}$ beat, according to the value of araddr[4:3] is 10, the read address decoder make the read controller try to address to Macro 2 (according to the addressing rules, it means that the burst_araddr[4:3] corresponding to the first transfer is 10, and the burst_araddr[4:3] corresponding to the last two transfers are 11 and 00 respectively). In the 5$^{th}$ beat, the write controller also tries to pre-read the data corresponding to the address of the third transfer while writes the data of the second transfer to Macro 1, that is, it also tries to access Macro 2.

In this case, since pre-read first, the write controller informs the read controller that in the current cycle (that is, the 5$^{th}$ beat), Macro 2 needs to be pre-read (the 5$^{th}$ beat burst_araddr[4:3] is shown as idle). After the read controller receives the indication that Macro 2 is occupied, it will suspend reading from Macro 2. Thus, in the 5$^{th}$ beat, the write controller completes the unaligned writing of the second transfer, and performs data pre-reading for the third transfer.

Then, in the 6$^{th}$ beat, the write controller still tries to access Macro 2 to complete the data writing for the third transfer. At this moment, after the reading and pre-reading conflict in the previous beat, a read-write conflict occurs. In the example shown in FIG. 11, the read operation can be delayed for another beat (burst_araddr[4:3] is still shown as idle in the 6$^{th}$ beat). The effects of the two-beat delay on the correlated signals are shown in boxes in FIG. 11. With a two-beat delay for read operations, read operations can be completely staggered from writes and pre-read. In this case, compared to the example in FIG. 8, the read is two beats slower, but the four unaligned writes of the write transaction will be compressed from 8 beats to 5 beats.

In the execution progress of the actual memory chip, since the number of memory banks is usually 4 or more (for example, 8, 16), the occurrence of read-write conflicts or read-pre-read conflicts is less than no conflict, and even when conflicts exist, conflicts in subsequent read and write transfers can be avoided by, for example, simple pull down the pre-read operations of writes. Usually, the address width of each increment of read and write operations is the same, so once they are staggered, during the entire burst process, subsequent conflicts can be avoided due to the continuous increments, thereby improving read and write efficiency. Even if the address width of the read and write addresses is different, it can be solved by pulling down writing for a beat when catching up. Since unaligned writing is a common operation, the pre-read operation of the present disclosure can greatly improve the efficiency of unaligned writing.

The memory operating method and memory according to the present disclosure have been described in detail above with reference to the accompanying drawings.

The present disclosure avoids the two-beat operation caused by unaligned write encoding by pre-reading the original data of the incremental address in the write beat. The above operation combined with the scheme of staggering the memory banks addressed by the read-write increment address by the low address decoding can improve the execution efficiency of the read-write parallel protocol. The operation scheme of the present disclosure is especially suitable for the memory complying with the AXI protocol and performs transfer-by-transfer arbitration and incremental address original data pre-reading to maximize memory access efficiency.

The present disclosure can also be implemented as an electronic device, the electronic device includes a host (e.g., a control unit) and a memory, and the host and the memory communicate in accordance with the read-write parallel protocol, for example, as the master and the slave of the AXI protocol. The memory can implement the above-mentioned operation method and avoid an extra clock cycle required for unaligned writing by pre-reading the original data in the next address. The memory of the present disclosure is particularly suitable for implementation as an on-chip memory, such as an on-chip SRAM.

In addition, it should be understood that the operation method of the present disclosure is also applicable to read-write parallel protocols other than the AXI protocol, and memories other than SRAM. In addition, the pre-read data is not only used for ECC, but also can be applied to the situation that other encoding lead to the process of reading-modifying-writing, which requires two beats. In addition, although it is especially suitable for combining with the low address mapping scheme, the pre-read scheme of the present disclosure is also applicable to other address mapping schemes, as long as the memory bank corresponding to the increment address is different from the memory bank corresponding to the current address. Also, while FIGS. 5 and 6 show the arbitration circuit, in other embodiments, read and write conflict arbitration can also be performed based on predetermined rules without setting up an arbitration circuit.

Having described various embodiments of the present disclosure, the foregoing description is exemplary, not exhaustive, and is not limited to the disclosed embodiments. Many modifications and alterations will be apparent to those of ordinary skill in the art without departing from the scope and spirit of the described embodiments. The terminology used herein is chosen to best explain the principle of each embodiment, practical application or improvement of technology in the market, or to enable other ordinary skilled in the art to understand each embodiment disclosed herein.

What is claimed is:

1. A memory operation method for unaligned write, the memory follows a read-write parallel protocol and includes a plurality of memory banks, the plurality of memory banks includes at least a first memory bank and a second memory bank, the method comprising:
   writing data currently to be written to a specified location of the first memory bank corresponding to a current logical address of a write transaction in a current clock cycle by a write controller;
   pre-reading original data in a specified location of the second memory bank corresponding to a next logical address of the write transaction in the current clock cycle by the write controller;
   encoding the pre-read original data and data to be written next of the write transaction by an encoder, when the write controller obtains an instruction of unaligned write to encode based on the pre-read original data in a next clock cycle; and
   writing the encoded data to the specified location of the second memory bank in the next clock cycle by the write controller.

2. The method of claim 1, wherein, pre-reading original data in a specified location of the second memory bank corresponding to the next logical address of the write transaction in the current clock cycle by the write controller comprising:
   sending an occupancy indication to the write controller by a read controller, for the write controller to determine whether to perform the pre-read operation in the current clock cycle, wherein the occupation indication indicates whether a read transaction is made to the second memory bank in the current clock cycle.

3. The method of claim 1, wherein, pre-reading original data in a specified location of the second memory bank corresponding to the next logical address of the write transaction in the current clock cycle by the write controller comprising:
   pre-reading the original data in the specified location of the second memory bank by the write controller, when a read controller indicates that no read transaction is performed on the second memory bank in the current clock cycle.

4. The method of claim 3, further comprising:
   when the read controller indicates that a read transaction is performed on the second memory bank in the current clock cycle, and the write controller obtains the instruction to encode based on the pre-read original data in the next clock cycle, then:
   reading the original data in the specified location of the second memory bank in the next clock cycle by the write controller;
   encoding the read original data and the data to be written next of the write transaction in a second next clock cycle by the encoder, wherein the second next clock cycle is a clock cycle next to the next clock cycle; and
   writing the encoded data to the specified location of the second memory bank in the second next clock cycle by the write controller.

5. The method of claim 1, wherein, pre-reading original data in a specified location of the second memory bank corresponding to the next logical address of the write transaction in the current clock cycle by the write controller comprising:
   sending an occupancy indication to a read controller by the write controller, for the read controller to determine whether to delay the execution of a read operation of a current logical address of a read transaction in the current clock cycle, wherein the occupation indication indicates whether a pre-read operation is made to the second memory bank in the current clock cycle.

6. The method of claim 5, further comprising:
   delaying the read operation of the second memory bank for the current logical address of the read transaction based on the occupation indication by the read controller, when a read address decoder maps the current logical address of the read transaction to the second memory bank in the current clock cycle.

7. The method of claim 1, wherein, the pre-read original data is put into a pre-read data buffer by the write controller in the current clock cycle, and is fetched from the pre-read data buffer by the encoder in the next clock cycle, and encoded with the data to be written next of the write transaction.

8. The method of claim 1, wherein, when the data currently to be written is the data to be written corresponding to the last logical address of the write transaction, the write controller does not perform the pre-read operation in the current clock cycle.

9. The method of claim 1, wherein, only encoding the data to be written next by the encoder of the write transaction, when an instruction not to perform encoding based on pre-read original data is obtained in the next clock cycle.

10. The method of claim 1, further comprising:
sequentially mapping a read transaction for consecutive logical addresses to different memory banks according to a predetermined transmission bit width by a read address decoder;
sequentially mapping a write transaction for consecutive logical addresses to different memory banks according to the predetermined transmission bit width by a write address decoder; and
arbitrating a read transfer of the read transaction and a write transfer of the write transaction mapped to the same memory bank in the current clock cycle by an arbitration circuit,
wherein, in case that specific low address bits of the logical addresses are the same, the read transfer and/or the write transfer are mapped to the same memory bank.

11. The method of claim 1, wherein, each write transaction comprises a plurality of write transfers, each of the write transfers corresponds to a different logical address and is used to write a copy of data to be written, each read transaction comprises a plurality of read transfers, and each of the read transfers corresponds to a different logical address and is used to read a copy of data.

12. The method of claim 1, wherein, the encoding is ECC encoding, and the encoder is an ECC encoder.

13. A memory, the data access of the memory follows a read-write parallel protocol, the memory performs an operation for unaligned write, and the memory comprising:
a plurality of memory banks, the plurality of memory banks includes at least a first memory bank and a second memory bank;
a write controller, configured to:
writing data currently to be written to a specified location of the first memory bank corresponding to a current logical address of a write transaction in a current clock cycle;
pre-reading original data in a specified location of the second memory bank corresponding to a next logical address of the write transaction in the current clock cycle; and
an encoder, configured to:
encoding the pre-read original data and data to be written next of the write transaction, when an instruction of unaligned write to encode based on the pre-read original data is obtained in a next clock cycle; and
only encoding the data to be written next, when an instruction not encoding based on pre-read original data is obtained in the next clock cycle,
and the write controller writes the encoded data to the specified position of the second memory bank in the next clock cycle.

14. The memory of claim 13, further comprising a read controller, configured to:
sending an occupancy indication to the write controller, for the write controller to determine whether to perform the pre-read operation in the current clock cycle, wherein the occupation indication indicates whether a read transaction is made to the second memory bank in the current clock cycle; or
receiving an occupancy indication sent by the write controller, and determining whether to delay the execution of a read operation of a current logical address of the read transaction in the current clock cycle, wherein the occupation indication indicates whether a pre-read operation is made to the second memory bank in the current clock cycle.

15. The memory of claim 13, further comprising:
a pre-read data buffer, configured to buffer the pre-read original data.

16. The memory of claim 13, further comprising:
a read address decoder, configured to sequentially map a read transaction for consecutive logical addresses to different memory banks according to a predetermined transmission bit width;
a write address decoder, configured to sequentially map a write transaction for consecutive logical addresses to different memory banks according to the predetermined transmission bit width; and
an arbitration circuit, configured to arbitrate a read transfer of the read transaction and a write transfer of the write transaction mapped to the same memory bank in the current clock cycle,
wherein, in case that specific low address bits of the logical addresses are the same, the read transfer and/or the write transfer are mapped to the same memory bank.

17. The memory of claim 16, wherein the arbitration circuit comprises:
a plurality of arbitration sub-circuits corresponding to the plurality of memory banks one by one,
wherein, each arbitration sub-circuit arbitrates in its corresponding memory bank for each read transfer included in the read transaction or each write transfer included in the write transaction.

18. The memory of claim 13, wherein the instruction to encode based on the pre-read original data comes from a bus signal received by the write controller, and the bus signal indicates that in the next clock cycle, the write transaction performs unaligned write operation to the next logical address.

19. The memory of claim 13, wherein, the write controller increments the current logical address in the current clock cycle to obtain the next logical address for the pre-read.

20. An electronic device comprising:
a control unit; and
a memory, wherein the control unit and the memory interact via a bus following a parallel read and write protocol, the memory performs an operation for unaligned write, and the memory is configured to:
write data currently to be written to a specified location of the first memory bank corresponding to a current logical address of a write transaction in a current clock cycle by a write controller;

pre-read original data in a specified location of the second memory bank corresponding to a next logical address of the write transaction in the current clock cycle by the write controller;

encode the pre-read original data and data to be written next of the write transaction by an encoder, when the write controller obtains an instruction of unaligned write to encode based on the pre-read original data in a next clock cycle; and write the encoded data to the specified location of the second memory bank in the next clock cycle by the write controller.

\* \* \* \* \*